United States Patent [19]

Luhowy

[11] 3,872,386

[45] Mar. 18, 1975

[54] TEST DEVICE

[76] Inventor: Gabriel J. Luhowy, 7181 College St., Lima, N.Y. 14485

[22] Filed: May 7, 1973

[21] Appl. No.: 358,089

[52] U.S. Cl.................... 324/98, 324/96, 324/133
[51] Int. Cl....................... G01r 17/02, G01r 19/14
[58] Field of Search............ 324/98, 123 R, 133, 96, 324/99 D, 99 R; 330/69

[56] References Cited
UNITED STATES PATENTS

| | | | |
|---|---|---|---|
| 3,076,901 | 2/1963 | Rubin et al. | 324/133 |
| 3,228,025 | 1/1966 | Welch | 324/99 D |
| 3,530,378 | 9/1970 | Holle et al. | 324/123 R |
| 3,530,389 | 9/1970 | Gormley et al. | 330/69 |
| 3,696,304 | 10/1972 | Fricke, Jr. | 330/69 |
| 3,747,006 | 7/1973 | Freeborn | 330/69 |

FOREIGN PATENTS OR APPLICATIONS

| | | | |
|---|---|---|---|
| 210,249 | 6/1968 | U.S.S.R. | 324/133 |

OTHER PUBLICATIONS

"Light–emitting diode . . ."; Electronics; Oct. 13, 1969; pg. 159–160.

*Primary Examiner*—Alfred E. Smith
*Assistant Examiner*—Ernest F. Karlsen
*Attorney, Agent, or Firm*—Jay M. Cantor

[57] ABSTRACT

The disclosure relates to a test instrument of compact size, operable with a battery source and capable of measuring with high precision voltages in the millivolt and low voltage ranges, milliamps, provide precision outputs in the millivolt and low voltage ranges, precision milliamps outputs and provide a two wire transmitter simulation. Measurements are made utilizing light emitting diode (LED) devices and operational amplifiers operating at high levels to minimize errors.

3 Claims, 10 Drawing Figures

| FIG. 2A | FIG. 2B |
| --- | --- |
| FIG. 2C | FIG. 2D |

TEST DEVICE

This invention relates to a test device capable of measuring and/or generating voltages and current with high precision as well as providing transmitter simulation and, more specifically, to a test device utilizing a pair of light emitting diodes (LED) to provide an indication of input or output parameter being measured or supplied in a test device.

Signal sources of the voltage and/or current generating type as well as voltage and/or current measuring devices are well known in the art. Prior art devices of this type have been bulky and fragile when providing high accuracy operation. The prior art battery operated test devices have been of doubtful accuracy and have also been subject to damage due to jarring, dropping and the like, often due to the use of a meter movement for measurement indication.

In accordance with the present invention, the above noted problems are overcome and there is provided a test device capable of generating precision measuring of voltages and currents and simulation of a two wire transmitter utilizing battery operated, compact equipment of pocket size.

Briefly, the above is accomplished utilizing operational amplifier circuits, one of the circuits being driven by a precision stabilized zener reference supply which feeds an inverting operational amplifier circuit having a potentiometer and precision resistor network in the feedback path to provide a highly accurate output voltage of selectable level. The output voltage is amplified or compared with a test signal in a second operational amplifier, depending upon whether a signal is to be generated or measured, the output of the second operational amplifier being fed to a pair of drivers, each driver feeding a light emitting diode for the signal measuring mode to determine when a null is obtained.

It is therefore an object of this invention to provide a test device utilizing an operational amplifier as an amplifier/comparator operated at high gain levels.

It is a further object of this invention to provide a test device utilizing an operational amplifier as an amplifier/comparator having a selectable precision voltage input applied to one input terminal thereof.

It is a yet further object of this invention to provide a precision voltage source comprising an operational amplifier having a precision voltage selector in a feedback circuit for selecting $n$ voltages using $\frac{1}{2}n + 1$ precision resistors.

It is a still further object of this invention to provide a null measuring device utilizing a pair of light emitting diodes, one indicating an overvoltage and the other an undervoltage.

The above objects and still further objects of the invention will become apparent to those skilled in the art after consideration of the following preferred embodiments thereof, which are provided by way of example and not by way of limitations, wherein:

Figures 1, 1A:
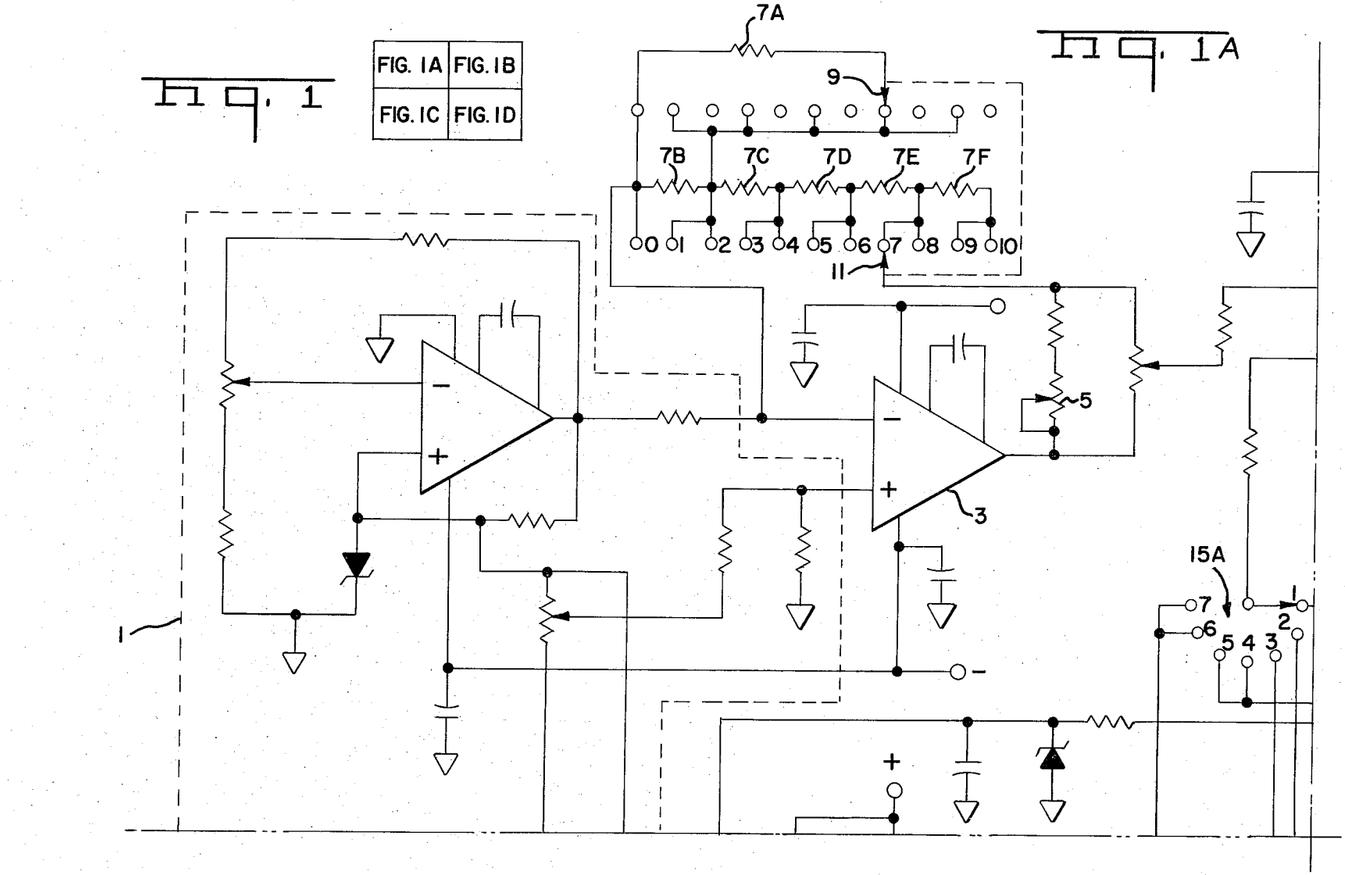
FIG. 1 is a diagram of the arrangement of FIGS. 1A through 1D.
FIGS. 1A through 1D are a circuit diagram of a first embodiment of the invention.

Referring now to FIGS. 1A through 1D, which are arranged as shown in FIG. 1, there is shown a circuit diagram of a first embodiment of the invention. The circuit includes a stabilized zener reference voltage supply 1, shown in FIGS. 1A and 1C, which feeds a stabilized precision voltage to an inverting operational amplifier 3. Amplifier 3 has a feedback path including a variable resistor 5 which is a fine adjustment and a course adjustment composed of six identical resistors 7A through 7F. In the preferred embodiment, resistors 7A to 7F are 2K ohms. It can be seen that when the switch arms 9 and 11 are in the leftmost position (0) none of resistors 7A to 7F are in the feedback path. As the arms 9 and 11 move to position 1, resistors 7A and 7B in parallel are placed in the feedback path. In position 2 only resistor 7B is placed in the feedback path and so forth. It is therefore apparent that the feedback signal is determined by the positioning of arms 9 and 11 and the setting of variable resistor 5. The combination of the supply 1 with the amplifier 3 and feedback circuit provide, in conjunction with the remainder of the circuit, the capability of precision voltage and current generation as well as precision voltage and current measuring capability. A preferred output voltage range from amplifier 3 is 0 to 11 volts.

The output of amplifier 3 is fed to one input terminal of an operational amplifier 13, the other input to amplifer 13 being provided via switch elements 15A of a gang switch 15. The output from amplifier 13 is the difference between the selectable precision voltage input thereto and the input thereto via switch 15A. It is therefore apparent that amplifier 13 will act as a true amplifier when a precision voltage or current is to be generated and will act as a comparator when a voltage or current is to be measured.

Figure 1B:
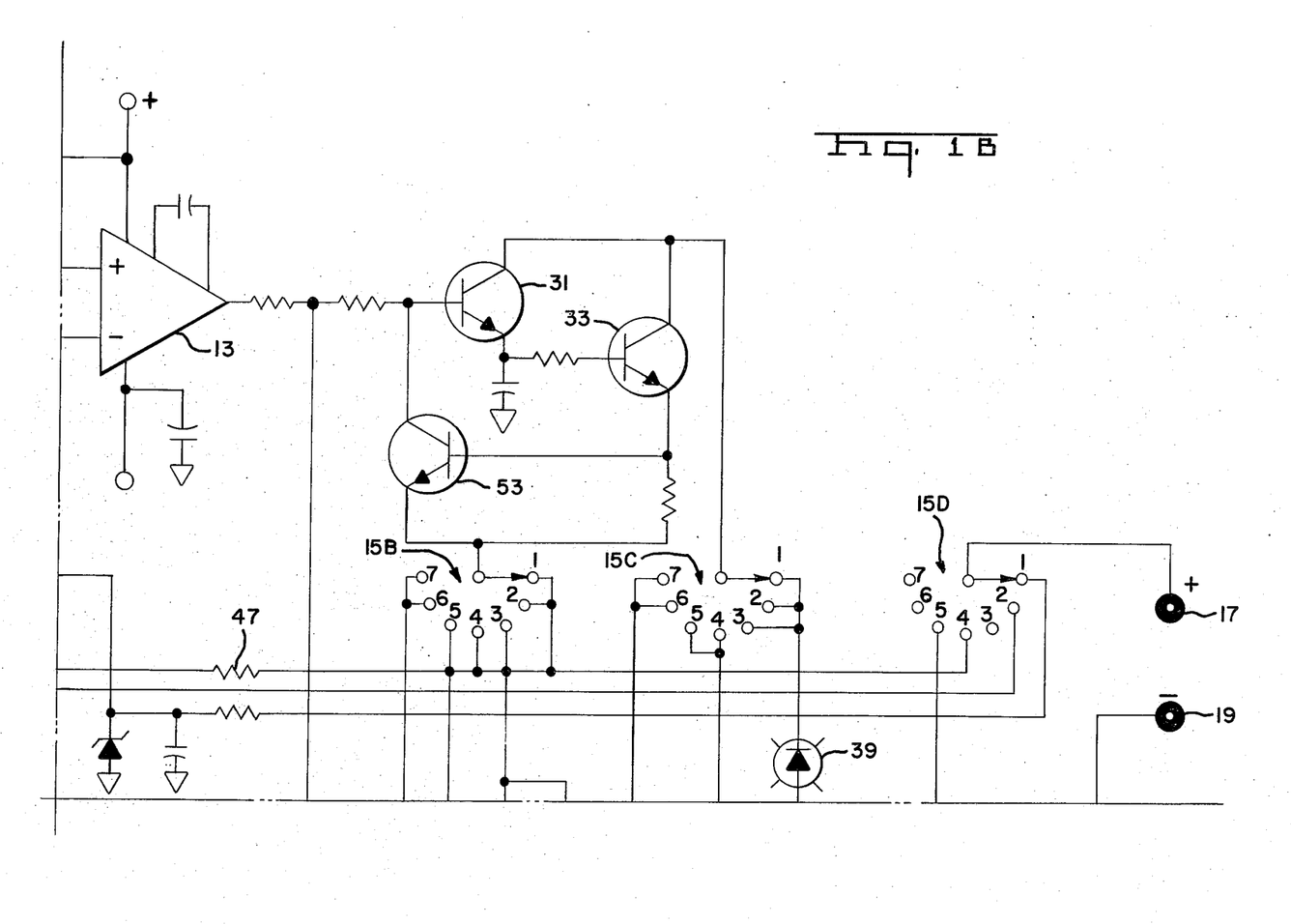
Figure 1C:
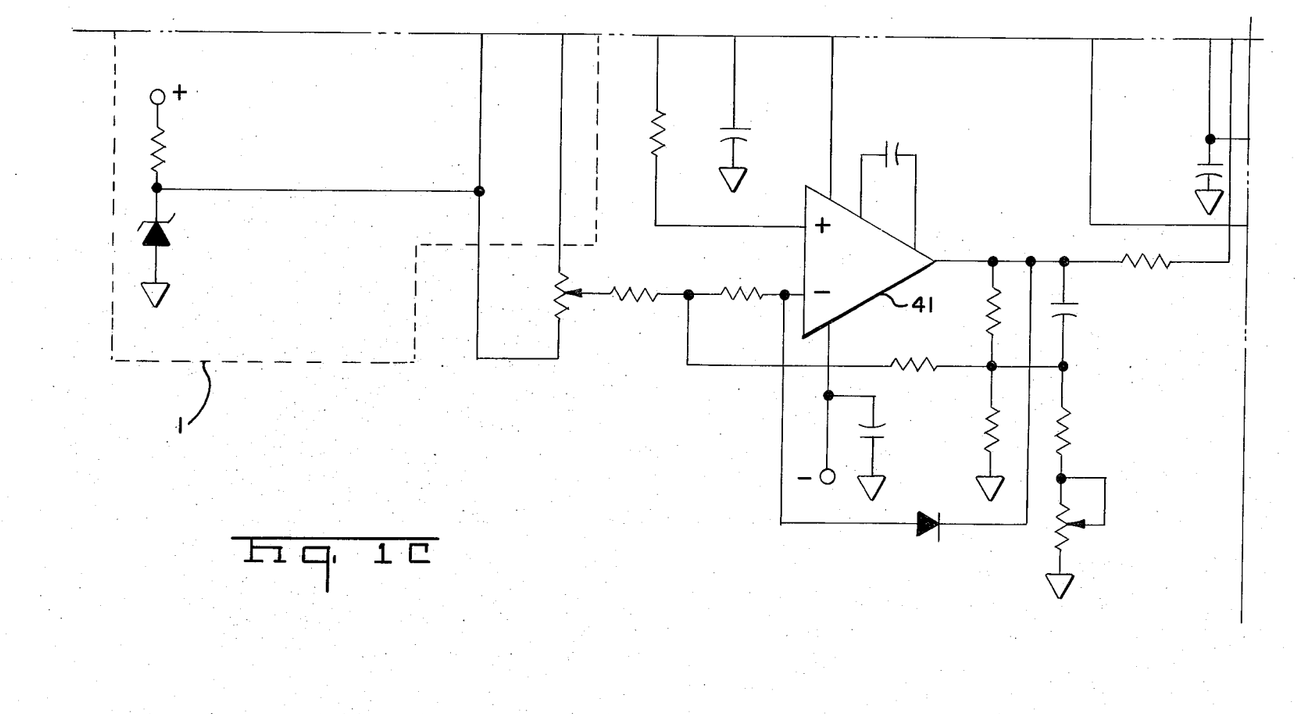

Referring now to the gang switch 15, shown in FIGS. 1A and 1B, there are seven possible settings numbered 1 through 7. The switch positions are as follows:

| POSITION | FUNCTION |
| --- | --- |
| 1 | Measures 0–11 volts input |
| 2 | Measures 0–110 millivolts input |
| 3 | Measures milliamps input |
| 4 | Generates 0–11 volts output |
| 5 | Generates 0–11 millivolts output |
| 6 | Generates milliamps output |
| 7 | Transmitter Simulator |

The operation of the above functions will now be described.

With switch 15 in position 1 and a voltage to be measured applied across terminals 17 and 19, FIG. 1B, the voltage applied at terminal 17 passes through switch elements 15D and 15A to the lower input to amplifier 13 which is operating as a comparator. If there is an imbalance, an output is provided of positive or negative polarity relative to a reference, depending upon the direction of imbalance. This imbalance will operate one of driver transistors 31 and 33 (FIG. 1B) or 35 (FIG. 1D), depending upon the polarity of the output from amplifier 13 and thereby cause one of light emitting diodes 37 and 39 to light. When the direction of imbalance has been determined from the diodes 37 and 39, the arms 9 and 11 are moved to different settings to provide a course precision voltage output from amplifier 3 and the fine adjustment 5 is then operated until the diodes 37 and 39 indicate that the null point has been reached. The measured voltage is now determined from the setting of the arms 9 and 11 and the position of potentiometer 5.

To measure millivolts input, the switch 15 is placed in position 2 and the voltage to be measured is applied across terminals 17 and 19. In this embodiment, the input voltage through switch element 15D goes to the top input of the operational amplifier 41, the other input of amplifier 41 being a reference voltage provided by the supply 1. Amplifier 41 is designed to provide a gain of 100, thereby raising the level of the input to the lower terminal of amplifier 13 via switch element 15A to correspond to the precision voltage input from amplifier 3 and concurrently maintain a high signal level in amplifier 13 to minimize errors due to noise and the like. The measurement is then made in the same manner described above for a position 1 setting except that the readout from the course and fine adjustment elements is in millivolts due to the amplification provided by amplifier 41.

To measure milliamps input, switch 15 is placed in position 3. The input signal to be measured is applied across terminals 19 and 21. The fuse 43 to ground, as in the other switch positions, prevents damage to the circuitry caused by an excessive voltage or current input. The input current at terminal 21 is applied across resistor 45 which is a precision resistor within 0.01 percent of rated value. The voltage drop across resistor 45 is applied via switch element 15A, position 3 to the lower terminal of amplifier 13. Since the current in milliamps has now been converted to a voltage, this voltage is compared with with precision input voltage in the same manner described above for position 1 of switch 15. The reading from the course and fine adjustments is now in milliamps.

For generation of an output voltage of 0 to 11 volts, for example, the switch 15 is placed in position 4 and the amplifier 13 now acts as a buffer amplifier. The course and fine adjustments composed of resistor network 7A to 7F, arms 9 and 11 and potentiometer 5 are adjusted to read the voltage to be generated. This voltage is applied to the upper terminal of amplifier 13 which is now unity gain and non-inverting. In this condition, the output of amplifier 13 is applied to drivers 31, 33 and 35 and provides a feedback through resistor 47 to the lower input of amplifier 13. The precision voltage output is obtained across terminals 17 and 19.

For generation of a millivolt output, switch 15 is placed in position 5. In this case the operation is identical to position 4 except that the output is taken through switch element 15D from a voltage divider composed of resistors 49 and 51. The ratio of the resistances of resistors 49 and 51 is designed to provide one hundredth of the output voltage in position 4. Typical values for resistors 49 and 51 can be 1,980 and 20 ohms respectively. The value ratio of resistors 49 and 51 is maintained within 0.001 percent of rated ratio.

Figure 1D:
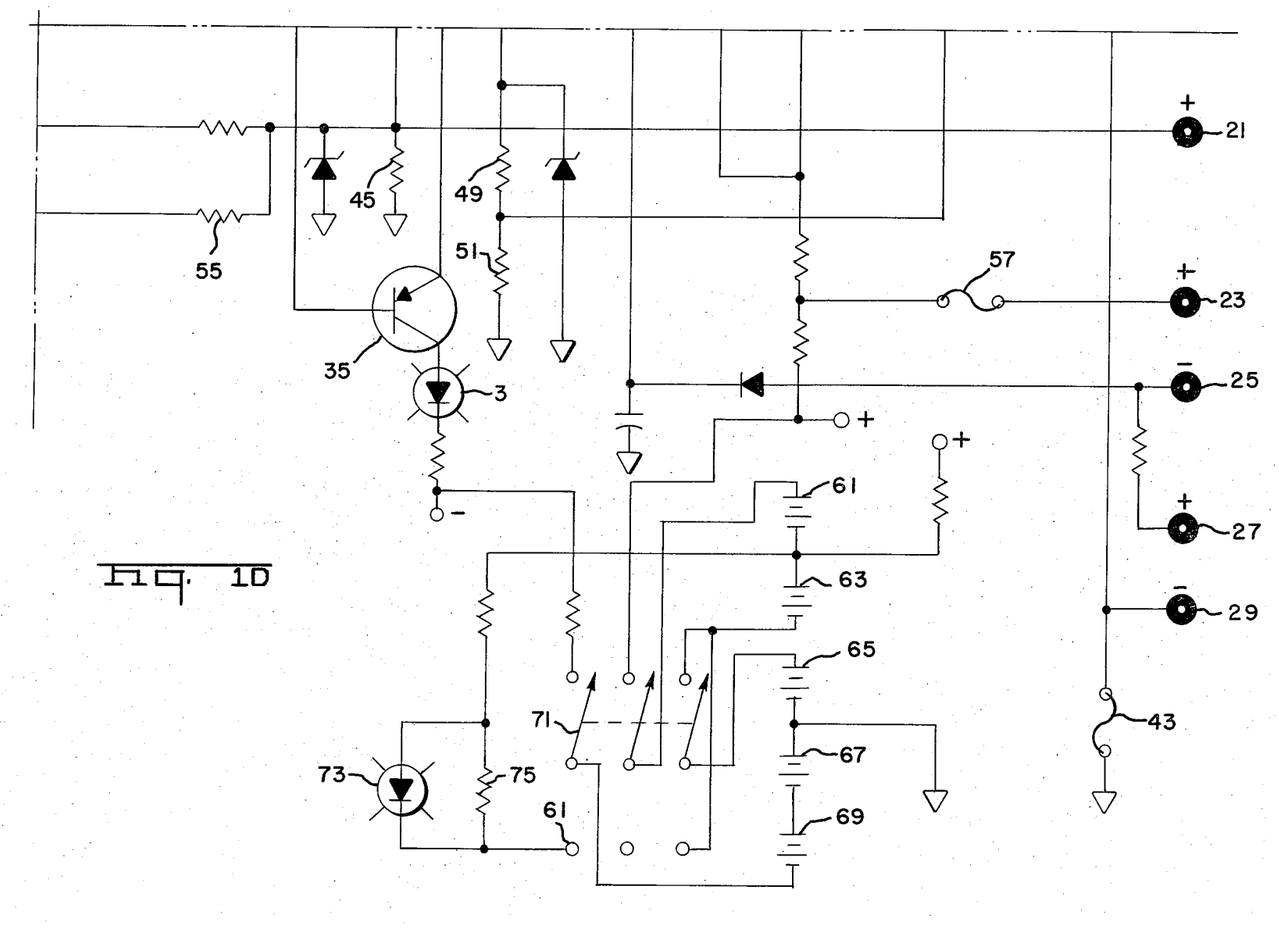

To provide a precision milliamp output, switch 15 is placed in position 6. In this condition, with the precision reference voltage, now scaled to milliamps, applied to the upper terminal of amplifier 13, the output via transistors 31, 33 and 53 is applied via switch 15B to resistor 45, FIG. 1D. A feedback voltage is generated across resistor 45 proportional to the current to the lower terminal of amplifier 13 via switch element 15A and resistor 55 (FIG. 1D). The output from the collector of transistor 31 is fed to the negative output terminal 25. The positive output terminal 23 goes through fuse 57 to a positive voltage source.

To provide a transmitter simulator, the switch 15 is placed in position 7. This position is used to calibrate two wire transmitters. In this mode of operation, the collectors of transistors 31 and 33 are placed in series with the battery from an external source, transistors 31 and 33 acting as a constant current source and being placed in the loop with the device under test which is connected across terminals 27 and 29. The resistance of transistors 31 and 33 is controlled by means of the feedback loop of amplifier 13 to provide a milliamp output.

The condition of the batteries 63, 65, 67 and 69 is checked by placing switch arm 71 in contact with terminal 61. The light emitting diode 23 is placed across resistor 75 of a voltage divider, the diode 73 lighting only when a sufficient voltage is present across resistor 75. When the batteries are low an insufficient voltage is available across resistor 75.

Figures 2, 2A:
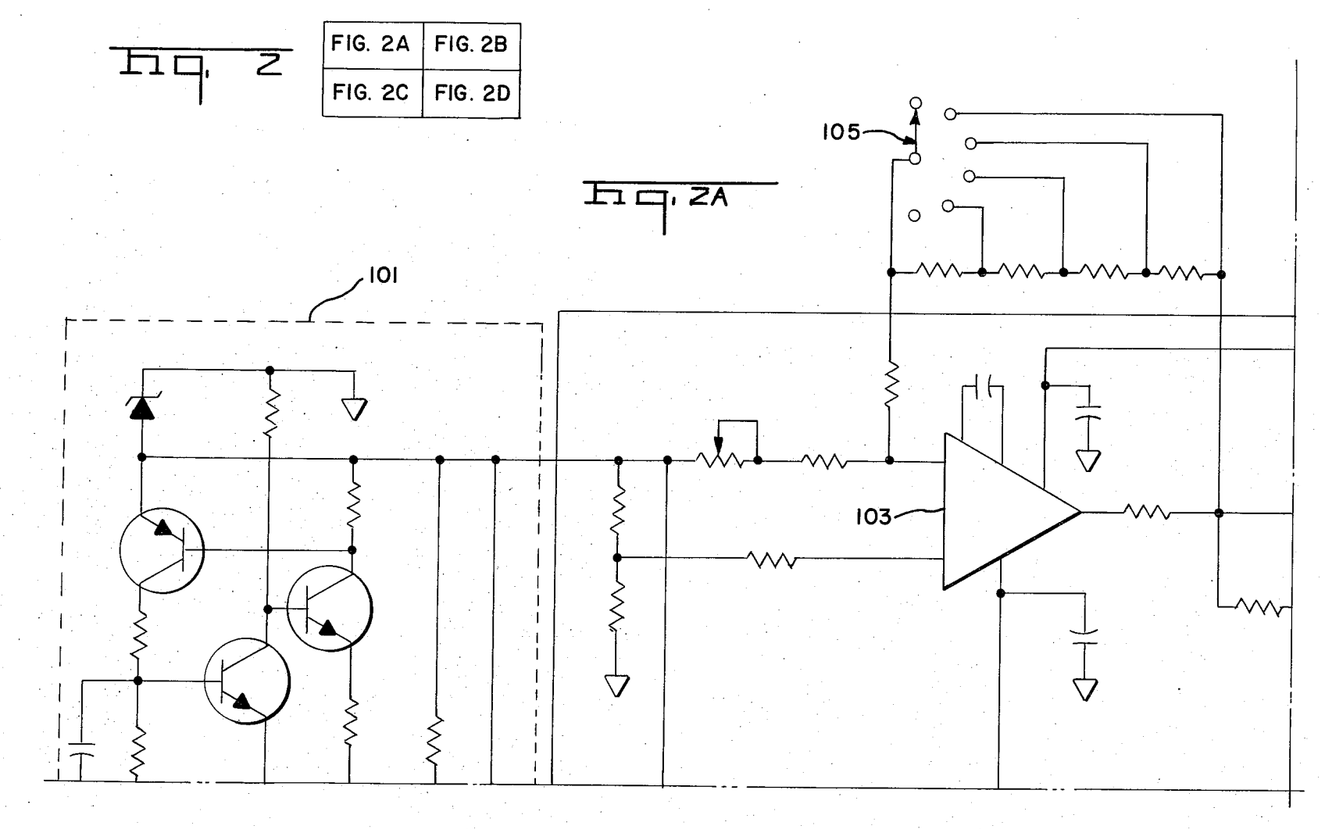
FIG. 2 is a diagram of the arrangement of FIGS. 2A through 2D.
FIGS. 2A through 2D are a circuit diagram of a second embodiment of the invention.
Figure 2B:
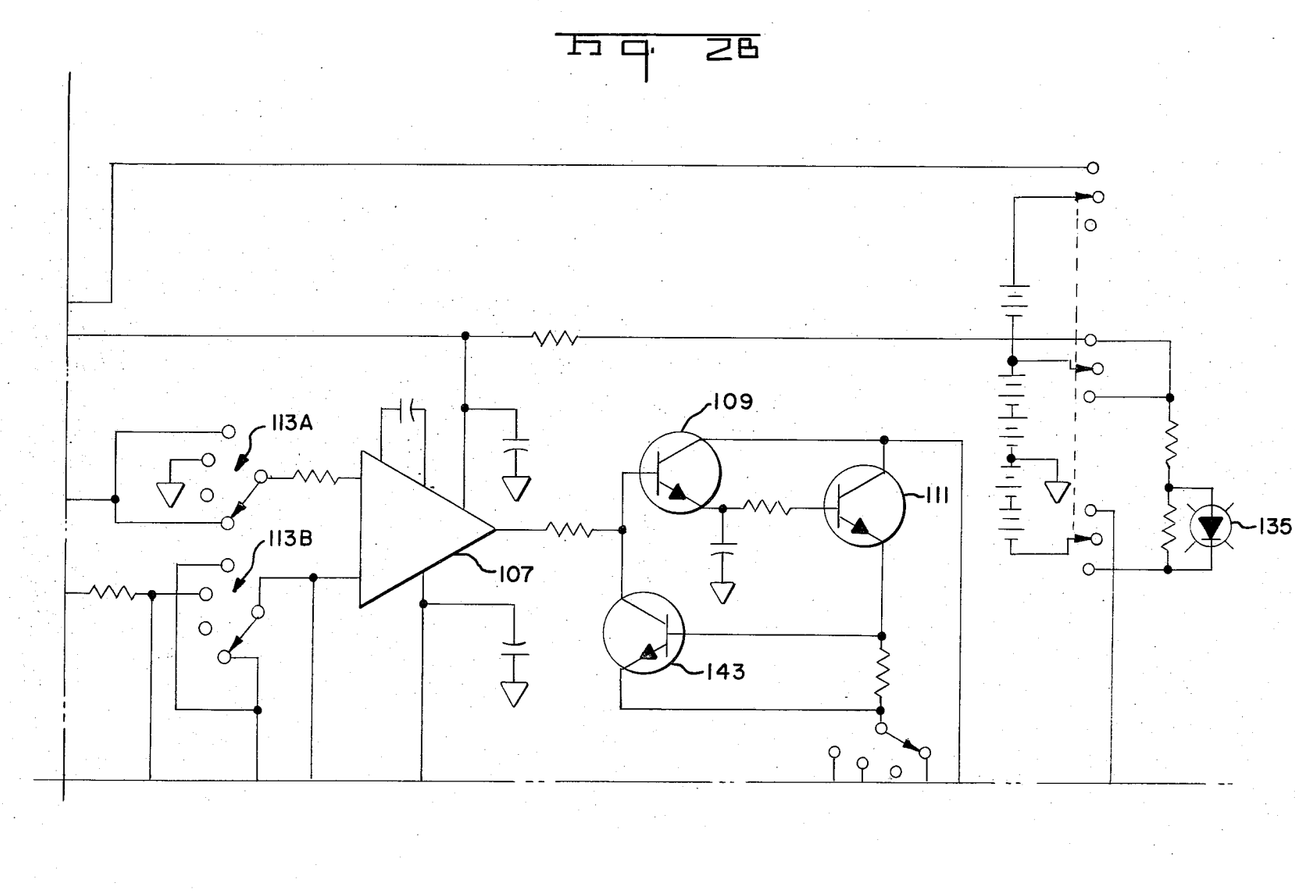
Figure 2C:
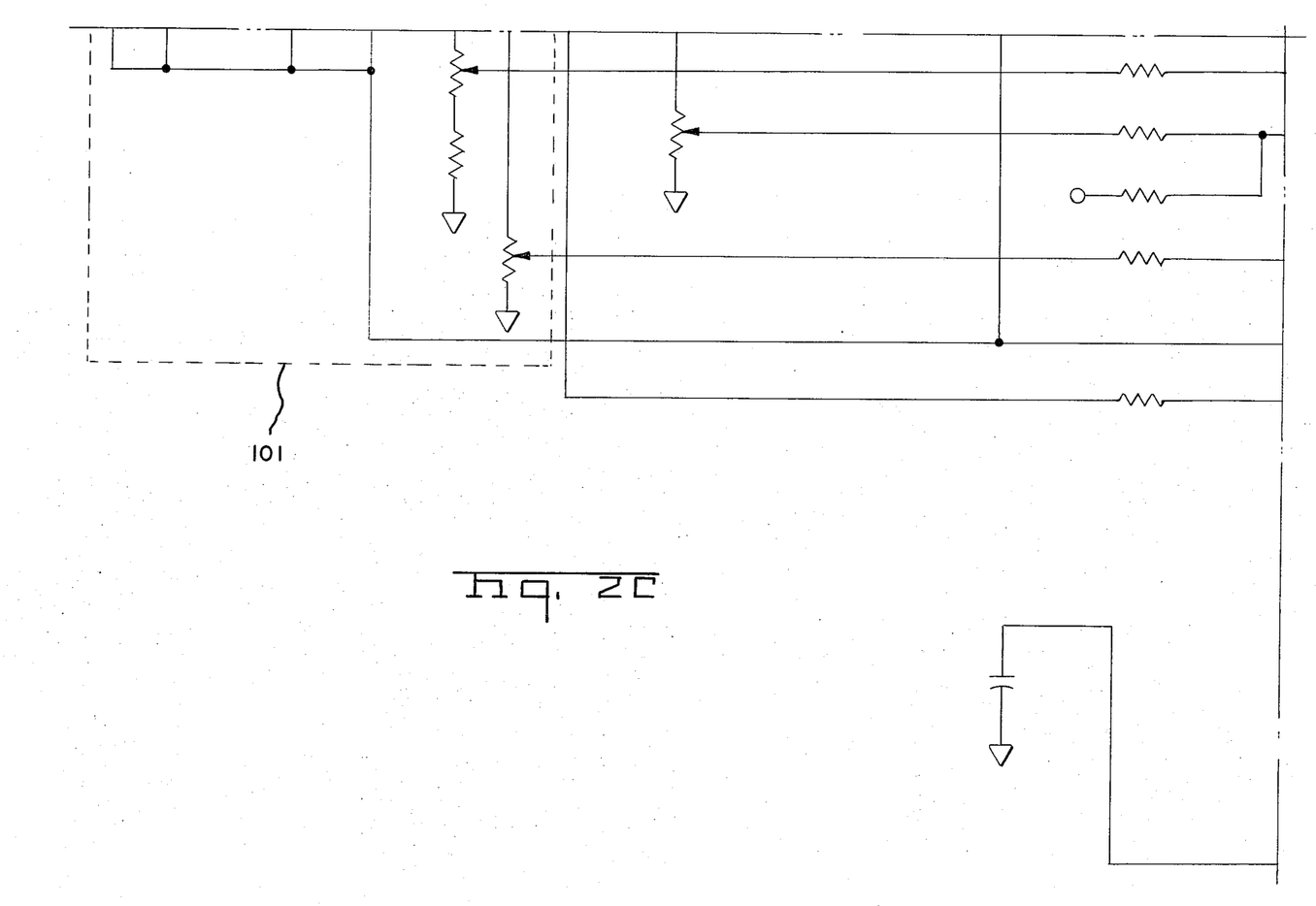
Figure 2D:
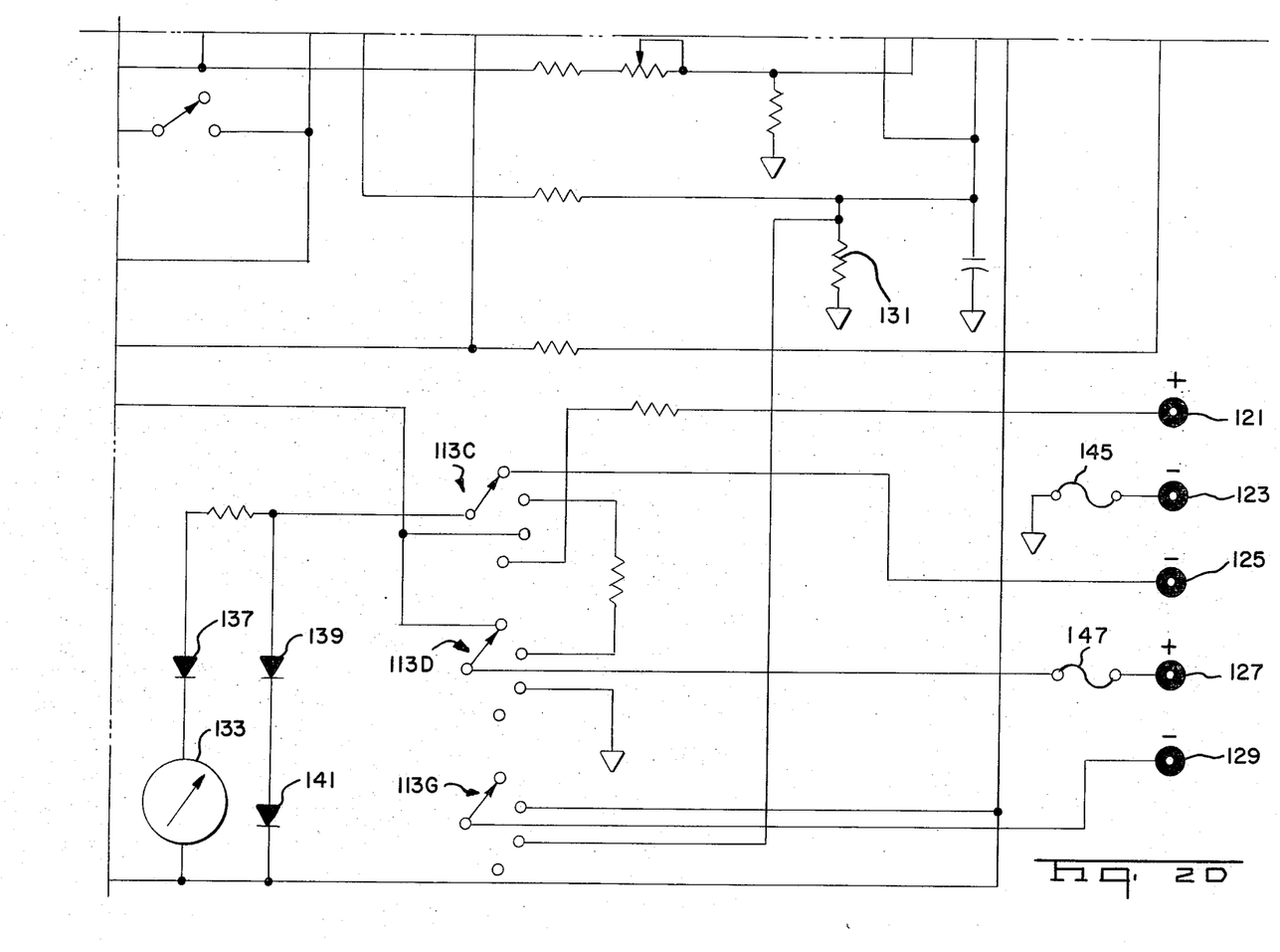

Referring now to FIG. 2 which shows the arrangement of FIGS. 2A to 2D there is shown a circuit diagram of a simplified version of the circuit of FIG. 1. This version utilizes a standard meter movement and measures milliamps input, milliamps output, milliamps deviation and transmitter simulation. This version includes a stabilized zener reference supply 101 as in the prior embodiment for providing supply power. There are four modes of operation which are determined by the setting of gang switch 113 which has switch elements 113A through 113E. Switch position 1 is for providing milliamps output via terminals 125 and 127. Switch position 2 is for providing milliamp current input measurement via terminals 127 and 129. Switch position 3 is for measuring milliamps deviation on terminals 127 and 129. Switch position 4 is for transmitter simulation on terminals 121 and 123.

The output voltage from the voltage reference 101 is coupled into operational amplifier 103. The gain of this amplifier is controlled by range switch 105. From aplifier 103, the reference voltage is coupled into operational amplifier 107. This amplifier in conjunction with transistors 109 and 111 serve as output amplifier for the source. The function of amplifier 107 and transistors 109 and 111 depend upon the setting of the function switch 113. In current output mode amplifier 107 and transistors 109 and 111 form a voltage to current converter with the output taken from the collector of transistors 109 and 11. The scale factor for the voltage to current converter is determined by scale factor resistor 131.

In the transmitter simulator mode the voltage supply to the collector of transistors 109 and 111 is replaced by the voltage from two wire DC power supply and may be anywhere from 22 to 24 volts. Other than this, operation is identical to the milliamp output function.

In the milliamp deviation mode the current must first pass through scale factor resistor 131 which acts as a sense resistor to convert current into a voltage signal Transistors 109 and 111 and operational amplifier 107 form a difference amplifier in which the unknown signal is compared to the output of reference amplifier 103. The output of the difference amplifier drives the meter 133 and is scaled to give ± 2.5 percent deviation over the full 4 inch scale on the meter.

When the instrument is used in the milliamp direct mode, the current is applied directly to the meter through a protection circuit which safeguards the meter against overflow or reversed current.

The battery check function applies the voltage from the batteries to a voltage divider driving an LED 135. If the voltage drops below a level satisfactory for operating the instrument the LED will not light. This indicates that the batteries need to be replaced.

Diodes 137, 139 and 141, transistor 143 and fuses 145 and 147 serve to protect the instrument against accidental misconnection or overload which might otherwise damage the instrument.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

What is claimed is:

1. A measuring system comprising in combination, a precision selectable first voltage, a differential operation amplifier having a pair of inputs and an output with one of said inputs connected to said first voltage, means coupled to the other of said inputs for providing an unknown input signal of a second voltage representing a predetermined condition, a pair of light emitting diodes normally in the same one of their on-off states, first voltage amplifying means coupled to said output and responsive to one of said polarities to change the state of one of the diodes, second voltage amplifying means coupled to said output and responsive to the other of said polarities to change the state of the other of said diodes and calibrating means for adjusting said first voltage to retain said diodes in the one of their on-off states, wherein the first and second means comprise driving transistors of opposite conductivity type.

2. A measuring system in accordance with claim 1 wherein the light emitting diodes are connected in the current path of a respective transistor.

3. A measuring system in accordance with claim 2 wherein said transistors are normally in a non-conductive state.

* * * * *